United States Patent [19]

McKenna et al.

[11] Patent Number: 5,684,967

[45] Date of Patent: Nov. 4, 1997

[54] SYSTEM AND METHOD FOR GENERALIZED NETWORK TOPOLOGY REPRESENTATION

[75] Inventors: John Joseph McKenna, Cary, N.C.; Luciene Costa Nascimento, Campinas, Brazil; Gary Alan Schlachter, Apex; Jonathan Stephen Beck, Durham, both of N.C.; Alison Cohen, Plano, Tex.

[73] Assignee: International Business Machines Corporation, Armonk, N.Y.

[21] Appl. No.: 527,666

[22] Filed: Sep. 13, 1995

[51] Int. Cl.⁶ .............................. G06F 15/00; H01J 13/00
[52] U.S. Cl. ............... 395/329; 395/200.02; 395/200.09; 395/200.1
[58] Field of Search .................................. 395/329, 335, 395/200.1, 200.09, 200.11, 200.02

*Primary Examiner*—Mark R. Powell
*Assistant Examiner*—Ba Huynh
*Attorney, Agent, or Firm*—John J. Timar

[57] ABSTRACT

System and method for storing in a generalized format, and representing on a graphical user interface, the topology information for a plurality of logical and physical resources in a heterogeneous computer communications network. Topological data for each network resource is encoded using a collection of record structures having a tabular format and stored in a plurality of topology information element tables which are categorized further as data element tables, relationship element tables and auxiliary element tables. The rows in the tables representing discrete data elements are recursively processed and correlated and presented as a generalized topology display via a user interface.

12 Claims, 3 Drawing Sheets

SYSTEM AND METHOD FOR GENERALIZED NETWORK TOPOLOGY REPRESENTATION

BACKGROUND OF THE INVENTION

This invention relates to computer networks and, more particularly, to a system and method for storing and representing on a graphical user interface the topological information of a plurality of network types.

A computer communications network is a collection of network nodes and end nodes interconnected through communication links. Each network node can be characterized as a data processing system providing certain functions within the network, such as routing of messages to other nodes, or providing directory services. The links between nodes can be permanent, such as conventional cable connections, or enabled only when needed, such as dial-up telephone connections. Collectively, the nodes and links of the computer communications network are referred to as network resources. The physical configuration and characteristics of the various nodes and links in a network are said to be the topology of the network.

A network management platform is a software application that monitors and controls a network. Network management platforms need to perform several key tasks in the network including discovering the devices in the network; collecting and storing data about network conditions; issuing and responding to notifications about network conditions; and issuing commands that cause actions at network nodes. In brief, the network management platform collects, processes, stores and displays network data.

The earliest network management platforms consisted primarily of application programs integrally related to the networked equipment. One of the most significant changes in the field of information processing in the past decade has been the shift away from large mainframe systems to systems that contain personal computers, workstations and other special purpose computers.

As networks became heterogenous, with devices coming from multiple manufacturers, it became necessary to physically separate the network management platform from the networked equipment. In this heterogenous environment, an agent application is responsible for reporting on and maintaining information related to one or more devices on the network. The agent provides the network information to a manager application, which is another software application that monitors and controls the network. The protocol used to communicate between the agent and the manager is unique for the networked equipment provided by the vendor.

With the proliferation of heterogeneous computer networks, it is increasingly uncommon to find networks conforming to the specifications of a single network management platform vendor. Although the Open Systems Interconnection Common Management Information Protocol (OSI CMIP) is the protocol most vendors expect to support in the future, and Simple Network Management Protocol (SNMP) is a current industry standard, it is unlikely that there will be a universal management protocol in the foreseeable future.

Current network management platform implementations generally have the capability only to represent network topology conforming to a single networking protocol. Where topologies conforming to distinct networking protocols can be represented, their representations are disjoint and unrelated even where the same networked equipment is involved as was described in the IBM System's journal article on "AIX NetView/6000" Vol.31, No.2, pp 270–385 (1992). Thus, there is a need for a method of creating and maintaining an arbitrary topological representation of a computer network involving an arbitrary configuration of equipment or an arbitrary collection of distributed program components.

SUMMARY OF THE INVENTION

It is an object of the present invention to provide an improved method and apparatus for encoding and displaying a general network topology for a communications network.

It is another object of the present invention to provide a method and apparatus for encoding and displaying the topology of a communications network that contains network devices and applications conforming to different network protocols.

According to one embodiment of the invention, a method is provided to create a plurality of tables which represents the network in an arbitrary fashion that is then presented to the user by a generic presentation application. These tables have the ability to maintain in a coordinated fashion an arbitrary number of topological representations, each associated with an arbitrary type of network, an arbitrary configuration of equipment, or an arbitrary collection of distributed program components. This will allow the connection of multiple networks as shown in FIG. 1 into a single generalized topology manager which provides information to a presentation application to provide a single, cohesive picture of the multiple networks.

BRIEF DESCRIPTION OF THE DRAWINGS

This invention will be described with respect to a preferred embodiment thereof which is further illustrated and described in the drawings.

DESCRIPTION OF THE PREFERRED EMBODIMENT

The invention finds its application in present-day complex, heterogeneous communications and data processing networks in which a variety of devices or applications are managed by network management applications.

In a data processing network, a process for managing the storage and upkeep of topological information is called a topology manager (TM). The invention provides for a generalized topology manager (GTM) that is independent of any particular protocol or discovery process. In the preferred embodiment, the GTM is implemented as part of a network management platform, such as IBM NetView for AIX, operating on a network management station which can be an IBM RISC System/6000 computer system running under the AIX operating system from IBM. However, implementation of the invention on a specific network management platform operating on a specific computer system or workstation does not limit or restrict the applicability of the present invention to the disclosed management platform or computer system.

The GTM is given information from an arbitrary number of independent discovery processes, hereinafter referred to as Topology Discovery Applications (TDAs) or Topology Agents running under the different networking protocols. The TDAs can be implemented as a component process in the network management platform.

Figure 1:
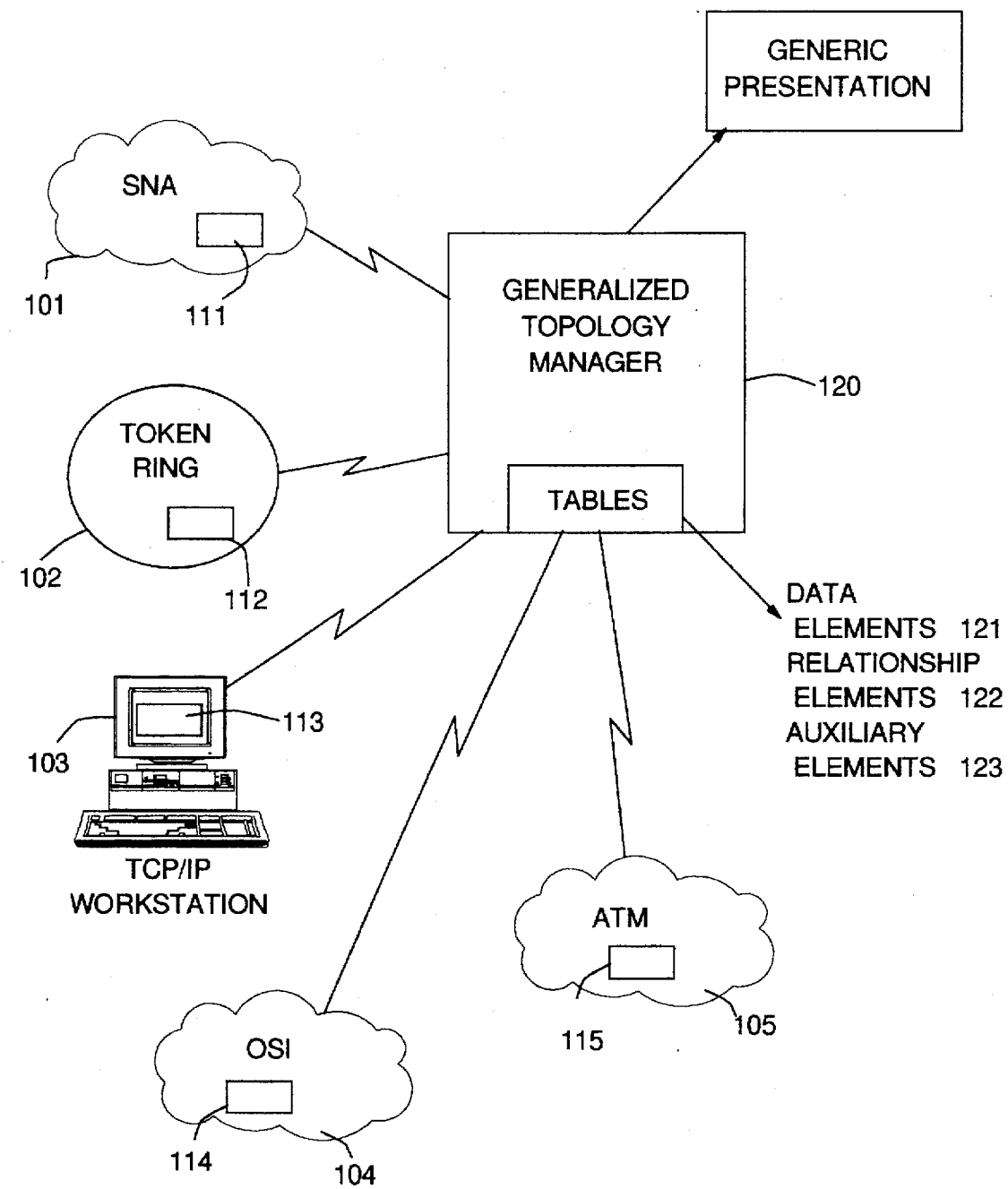
FIG. 1 illustrates a computer communications network environment utilizing the method and system of generalized network topology representation, according to a preferred embodiment of the present invention.

FIG. 1 illustrates a typical environment for a complex, heterogeneous communications network in which the present invention is implemented. As shown by FIG. 1, many networks today are created by appending a plurality of smaller networks to each other. Each of these smaller networks can utilize a different protocol. The network depicted in FIG. 1 contains an SNA subnetwork 101, a token ring subnetwork 102, a TCP/IP subnetwork 103, an OSI subnetwork 104 and an ATM subnetwork 105. Each of these subnetworks contains its own topology agent 111-115. Although each of these agents may have different information reported by the devices in its subnetwork, each agent will report a consistent set of information to the generalized topology manager 120. The topology information elements used in the preferred embodiment are defined and described in the tables shown in the Appendix. When information is sent from the TDA to the GTM, the GTM stores it in the appropriate tables 121-123.

The tables 121-123, are created based on the topology information elements described in the Appendix, and derive principal value from a concise method of encoding topologically significant data using a collection of record structures having a tabular format. The Topology Information Elements are organized into three categories—Data elements 121, Relationship elements 122, and Auxiliary elements 123. Each of these elements are described below and are more fully described in a corresponding table in the Appendix.

Data elements 121 constitute information required to maintain a machine readable encoding of significant topological relationships. Data elements include vertices, graphs, arcs and simple connections defined as follows:

Vertex

A vertex table identifies a collection of vertices, with each vertex representing a point in a network that contains an interface within a system that is managed. An interface provides access to a network or service. A vertex may be either a physical resource such as a token ring connection or a logical resource such as an Internet Protocol (IP) member. The invention supports the various protocol-dependent network types identified by the Vertex Protocol type definition provided in Appendix Table 1. The complete definition of a vertex element is provided in Appendix Table 2.

Graph

A graph table identifies a collection of graphs, with each graph representing either the connectivity of a network or the configuration of equipment containing vertices which are part of network topologies. There are two basic types of graphs: topology graphs and box graphs.

A topology graph is typically a connected graph representing the topology of a network. The topology graph represents either a resource-specific topology or a higher-level topology such as a graph where membership is defined based on management domains or any other user-defined grouping.

A box graph represents the vertices contained within network equipment. Such vertices may represent both physical and logical resources, including network interfaces and application programs.

Both types of graphs may contain vertices and other graphs, although box graphs typically contain only vertices. A vertex may also be a member of multiple graphs. The complete definition of a graph element is provided in Appendix Table 8.

Arc

An arc table identifies a collection of arcs, with each arc representing endpoint independent connection between two vertices or graphs. Arcs may represent resources such as an SNA session or they may represent user-defined connections such as groupings of transmission channels similarly to the way graphs enable the aggregation of topologies. The complete definition of an arc element is provided in Appendix Table 6.

Simple Connection

A Simple connection table identifies a collection of simple connections, with each simple connection representing information about a connectivity relationship in the network which is known only to an endpoint. Thus a simple connection is an endpoint's view of a connection. The complete definition of a simple connection element is provided in Appendix Table 4.

A topology graph serves two main purposes. The first purpose is to depict a resource-specific topology such as local area network configuration. The second purpose is to group nodes (represented as vertices) and other graphs in a network into higher-level graphs, constructed based on user-defined criteria such as physical location, owning organization, or other partitioning schemes. Thus, higher-level graphs provide a way to represent partitions of a topology based on how a user thinks about a network and chooses to approach its management.

When drawing a topology display, a graph can be drawn as a vertex, thus a graph can be used to provide the zoom-in and zoom-out functions commonly associated with graphical topology display providing a mechanism to represent different levels of abstraction about a network. In a topology graph, such functions are used to show the underlying connectivity of a network or subnetwork to reduce such connectivity to an icon. In a box graph, such functions are used to show the placement of interfaces within equipment or to reduce such a configuration to an icon.

The second category of Topology Information Elements are relationship elements. Relationship elements 122 constitute information required to present a graphical representation of resources in such a fashion as to preserve their topological relationships as defined by Data Elements 121. Relationship elements 122 include members, member arcs, graph attached arcs, underlying arcs, underlying connections, and service access points defined as follows:

Members

A member table identifies all vertices and graphs which are a part of a graph. There is one entry for each member vertex and each member graph. Vertices and graphs may be part of multiple graphs. The complete definition of a member element is provided in Appendix Table 11.

Member Arcs

A member arc table identifies all the arcs which have both endpoints contained within a given graph. There is one entry for each such arc. An arc may have both the endpoints within multiple graphs, and it may be associated with other graphs for which only one endpoint is contained. The complete definition of a member arc element is provided in Appendix Table 9.

Graph Attached Arcs

A graph attached arcs table identifies all arcs which have only one endpoint within a graph and which are to be drawn as attached to the graph when it is drawn as a vertex. An arc may be attached to multiple graphs and may be a member arc for multiple other graphs. The complete definition of a graph attached arc element is provided in Appendix Table 10.

Underlying Arcs

An underlying arcs table identifies the set of arcs which are contained within another given arc. Underlying arcs may be either parallel, having the same endpoints as their containing arcs, or serial, having at least one endpoint which is distinct from both endpoints of their containing arc. An arc may contain both parallel and serial underlying arcs. The complete definition of an underlying arc element is provided in Appendix Table 7.

Underlying Connections

An underlying connections table identifies the set of simple connections which are contained within another given simple connection. Thus an underlying connection table can be used to show an endpoint's view of a connection as including a bundle of subordinate connections. The complete definition of an underlying connections element is provided in Appendix Table 5.

Service Access Point

The service access point table identifies user-provided relationships between vertices. It provides a means for correlating the behavior or distinct protocol entities having such relationships. Vertices which represent higher-level resources may use the services of other vertices. For example, an Internet Protocol (IP) module might obtain physical transport from a local area network (LAN). Accordingly, a vertex representing the LAN station would provide a service access point for use by the IP module. This relationship would be represented by an entry in the service access point table. The complete definition of a service access point element is provided in Appendix Table 3.

The third category of Topology Information Elements are auxiliary elements. Auxiliary elements 123 constitute information needed for augmenting the graphical representation derived from data elements 121 in conjunction with relationship elements 122. Auxiliary elements 123 include additional graph information and additional members information defined as follows:

Additional Graph Information

An entry in the additional graph information table represents general display specifications related to a graph, including the following information:
  The value and location of arbitrary text in an arbitrary location within the display window.
  The identity of the center vertex to be used by layout algorithms having a 'star' characteristic. The complete definition of an additional graph information element is provided in Appendix Table 13.

Additional Members Information

An entry in the additional members information table represents general display specifications related to a member of a graph including the scale and placement of the icon representing the member in the display window. The complete definition Of an additional members information element is provided in Appendix Table 12.

The data elements 121, relationship elements 122, and auxiliary elements 123 are utilized in this invention to maintain the generalized topological representation. The method for maintaining topology information employs signals transmitted by Topology Discovery Applications (TDAs) and received by the Generalized Topology Manager, an example of such a signal is the TRAP SNMP data unit. These data units indicate fundamental alterations to previously initialized topology information and include new element, deleted element, operational status change, variable value change, and upkeep signals defined as follows:

New Element

The new element signal is issued whenever a new row is added to one of the topology information elements. The new element signal contains a complete representation of the row.

Deleted Element

The deleted element signal is issued whenever an existing row is removed from a previously reported topology information element. It contains the unique index variable value previously assigned to the row.

Operational State Change

The operational state change signal is issued whenever a state variable for a row or row equivalent requires change to properly reflect the state of the resource being represented. It contains the unique index variable value previously assigned to the row representing the resource as well as the new state variable value. Such state variables include, but are not limited to, the following variables:
  operationalState
  unknownStatus
  availabilityStatus
  alarmState
  State variable definitions are provided in Appendix Table 1.

Variable Value Change

The variable value change signal is issued whenever a non-state variable for a row or row equivalent requires change to properly reflect the current variable value for the resource being represented. It contains the unique index variable value previously assigned to the row representing the resource as well as the values of all variables which have changed.

Propagating Upkeep Information

Upkeep signals are received by the GTM from the respective TDAs and are propagated by means of an inline forwarding mechanism such as the TRAP forward mechanism. These signals are propagated to Topology Presentation Applications which have registered their intent to receive such information.

In some circumstances it is desirable to throttle or control the propagation of topology upkeep information. Such controls are supplied in the form of Boolean switches which are maintained by the GTM for reference by the entities registered to receive the upkeep signals. The controls are described in Appendix Table 14. A separate instance of controls is established for each such registered entity. The controls include:

newVErtex
deletedVertex
vertexStateChange
vertexVariableChange
newSimpleConnection
deleteSimpleConnection
simpleConnectionStateChange
simpleConnectionVariableChange
newArc
deletedArc
arcStateChange
arcVariableChange
newGraph
deletedGraph
graphVariableChange There are various techniques for retrieving information maintained by a topology manager from the tables. Any one of these known methods can be used and in no way limit the scope of this invention.

The method of presenting the topology information in the present invention involves mapping the Topology Information Elements in Tables 121–123 to elements of a user interface which includes means to create and display windows and symbols. The Topology Information Elements of graph, arc, and simple connection are presented as windows. The Topology Information Elements of graph, members, member arcs, underlying arcs and underlying connections are presented as symbols on the windows. The algorithm for displaying the topology information contained in the GTM format is described below:

In the following description, all terms highlighted are either rows or columns in one of the tables described in the Appendix.

The convention of row.column is also used in the following algorithm description. The row is a specific row in one of the tables defined in the Appendix. The column is the value of the column in a specific row in one of the tables defined in the Appendix.

Terms used in the following description:

| Term | Characteristics |
| --- | --- |
| Symbol | Properties include a label, an icon, and an optional position. |
| Window | Properties include a layout algorithm and a background graphic. |
| Root Window | The top-level window displayed to the user. |
| Orphan Graph | A row of the graph table that is not a member of another row of the graph table. |

The specific algorithm for displaying data contained in the GTM format is as follows:

Algorithm for displaying data contained in the GTM format :

1. FOR each row of the Graph table :

a. Let this row of the Graph table be called *Parent Graph* for the remainder of step 1.

b. IF (Parent Graph.isRoot = = TRUE) THEN

Create a symbol for each Root Graph

Find all Root Graphs, and create symbols representing these graphs on the root window.

1) Find the row of the Additional Graph Information table such that (addGraphProtocol = = Parent Graph.graphProtocol) AND (addGraphName = = Parent Graph.graphName).

2) Let this row of the Additional Graph Information table be called *Graph Info* for step 1b3.

3) Create a symbol representing the Parent Graph on the Root Window.

Use the Graph Info.rootGraphLabel and Graph Info.rootGraphIcon for the symbol's properties.

c. IF (Parent Graph.isRoot = = TRUE) OR (Parent Graph is an Orphan Graph) THEN

Start by processing Root Graphs and Orphan Graphs

If the Parent Graph is either a Root Graph or an Orphan Graph, then create a window for the Parent Graph. In addition, create a symbol on the Parent Graph's window for each Member and Member Arc contained by the Parent Graph.

19

RA994036

1) IF (there is no window representing Parent Graph in the EUI) THEN a) Create a window for Parent Graph.

Display the graphic defined by Parent Graph.backgroundMap on the background of this window.

When symbols are created on this window, arrange them in a layout defined by Parent Graph.layoutAlgorithm and Parent Graph.userDefinedLayout.

b) FOR each row of the Members table :

Create a symbol for each Member

Create a symbol on the Parent Graph's window for each Member contained by the Parent Graph.

i. Let this row of the Members table be called *Member* for the remainder of step 1c1b.

ii. Let the object identified by Member.memberComponentProtocol, Member.memberComponentName be called *Member Component* for the remainder of step 1c1b.

iii. IF (Member.memberProtocol == Parent Graph.graphProtocol) AND (Member.memberName == Parent Graph.graphName) THEN i) Create a symbol that represents the Member Component on the Parent Graph's window.

Use the Member.memberLabel and Member.memberIcon from this row of the Members table for the symbol's properties.

ii) IF (Parent Graph.layoutAlgorithm == NONE) THEN

Set the position of each Member

If the Parent Graph's layout algorithm is NONE, then the position of each of the Parent Graph's Members may have to be set explicitly. Each Member's position information, if set, is contained in the Additional Members Information table.

If the Parent Graph's layout algorithm is not NONE, then the position of each Member is determined by the layout algorithm. For example, if the Parent Graph's layout algorithm is set to spoked-ring, then the symbols representing the Parent Graph's Members are arranged in a circle on the Parent Graph's window.

RA994036

1. Find the row of the Additional Members Information table such that (aMemberProtocol = = Member.memberProtocol) AND (aMemberName = = Member.memberName) AND (aMemberComponentProtocol = = Member.memberComponentProtocol) AND (aMemberComponentName = = Member.memberComponentName).

2. Let this row of the Additional Members Information table be called *Member Info* for step 1c1biiiii3.

3. Set the position of Member Component's symbol on the Parent Graph's window to Member Info.xCoordinate, Member Info.yCoordinate on a grid defined by Member Info.xGrid, Member Info.yGrid.

iii) IF (Member.memberComponentProtocol is of type Object Identifier, which means that the Member Component is a Graph) THEN

Recursively process each Graph

If the Member contained by the Parent Graph is itself a Graph, then we need to create a window for that Graph. In addition, we need to create symbols on that Graph's window that represent the Members and Member Arcs contained by that Graph.

1. Find the row in the Graph table such that (Member.memberComponentProtocol = = Parent Graph.graphProtocol) AND (Member.memberComponentName = = Parent Graph.graphName)

2. Let this row of the Graph table be known as the *Parent Graph* for step 1c1biiiii3.

3. Go to step 1c1 and return here when finished with step 1c1c.

c) FOR each row of the Member Arcs table :

Create a symbol for each Member Arc

Create a symbol on the Parent Graph's window for each Member Arc contained by the Parent Graph.

i. Let this row of the Member Arcs table be called *Member Arc* for the remainder of step 1c1c.

21 ii. IF (Member Arc.maGraphProtocol == Parent
Graph.graphProtocol) AND (Member Arc.maGraphName ==
Parent Graph.graphName) THEN The symbols representing the Member Arc's endpoints are
created at a different time in the algorithm, in step 1b3.
The two end points are represented by two rows in
the Members table.

i) One endpoint of Member Arc is stored in the row of the
  Members table such that (memberProtocol == Member
  Arc.maGraphProtocol) AND (memberName == Member
  Arc.maGraphName) AND (memberComponentProtocol
  == Member Arc.maAendpointProtocl) AND
  (memberComponentName == Member
  Arc.maAendpointName.).

Let this endpoint be called *Member Arc Endpoint A* for the
  remainder of step 1c1cii.

ii) The other endpoint is stored in the row of the Members
  table such that (memberProtocol == Member
  Arc.maGraphProtocol) AND (memberName == Member
  Arc.maGraphName) AND (memberComponentProtocol
  == Member Arc.maZendpointProtocl) AND
  (memberComponentName == Member
  Arc.maZendpointName.).

Let this endpoint be called *Member Arc Endpoint Z* for the
  remainder of step 1c1cii.

iii) Create a symbol representing the Member Arc on the
  Parent Graph's window.

This symbol connects the symbol that represents Member
  Arc Endpoint A to the symbol that represents Member Arc
  Endpoint Z.

Use the Member Arc.maLabel and Member Arc.maIcon for
  the symbol's properties.

iv) Find the row of the Arc table such that (aEndpointProtocol
  == Member Arc.maAendpointProtocol) AND
  (aEndpointName == Member Arc.maAendpointName)
  AND (zEndpointProtocol == Member
  Arc.maZendpointProtocol) AND (zEndpointName ==
  Member Arc.maZendpointName) AND (arcIndexId ==
  Member Arc.maArcIndexId.).

v) Let this row of the Arc table be called *Parent Arc* for the
  remainder of step 1c1c.

vi) IF (Parent Arc.aDetailsIndexId != -1) THEN

RA994036

Create a symbol for each Simple Connection

If the Parent Arc is composed of Simple Connections, then create symbols on the Parent Graph's window that represent the Parent Arc's Simple Connections.

1. Find the row of the Simple Connection table such that (localEndpointProtocol == Parent Arc.aEndpointProtocol) AND (localEndpointName == Parent Arc.aEndpointName) AND (simpleConnIndexId == Parent Arc.aDetailsIndexId).

2. Let this row of the Simple Connection table be called *Parent Connection* for the remainder of step 1c1ciivi.

3. Create a symbol representing the Parent Connection on the Parent Graph's window.

This symbol connects the symbol that represents Member Arc Endpoint A to the symbol that represents Member Arc Endpoint Z.

Use Parent Connection.simpleConnLabel and Parent Connection.simpleConnIcon for the symbol's properties.

4. FOR each row of the Underlying Connections table :

Create a symbol for each Underlying Connection

If the Simple Connection has Underlying Connections, then create a window for the Simple Connection. Create a symbol on the Simple Connection's window for each of the Simple Connection's Underlying Connections.

a. IF (ulcEndpointProtocol == Parent Connection.localEndpointProtocol) AND (ulcEndpointName == Parent Connection.localEndpointProtocol) AND (ulcEndpoingId == Parent Connection.simpleConnIndexId) THEN 1) Let this row of the Underlying Connections table be called *Underlying Connection* for the remainder of step 1c1ciivi4a.

2) IF (there is no window representing Parent Connection in the EUI) THEN a) Create a window for Parent Connection.

Do not display a background graphic in this window.

b) IF (Underlying Connection.underlyingConnectionKind == serial) THEN

23

RA994036 i. When symbols are created on this
　　　　　window, arrange them as Serial Con-
　　　　　nections.

c) IF (Underlying
　　　Connection.underlyingConnectionKind ==
　　　parallel) THEN i. When symbols are created on this
　　　　　window, arrange them as Parallel Con-
　　　　　nections.

3) Find the row of the Simple Connection table
   such that (localEndpointProtocol == Under-
   lying Connection.uconnEndpointProtocol) AND
   (localEndpointName == Underlying
   Connection.uconnEndpointName) AND
   (simpleConnIndexId == Underlying
   Connection.uconnSimpleConnId).

4) Let this row of the Simple Connection table be
   called *Child Connection* for the remainder of
   1c1ciivi4a.

5) Create a symbol representing the endpoint
   **Child Connection.localEndpointProtocol, Child
   Connection.localEndpointName** on the Parent
   Connection's window.

Use Underlying Connection.ulcLocalLabel and
   Underlying Connection.ulcLocalIcon for the
   symbol's properties.

6) Create a symbol representing the endpoint
   **Child Connection.connectionPartnerProtocol,
   Child Connection.connectionPartnerName** on
   the Parent Connection's window.

Use Underlying Connection.ulcPartnerLabel
   and Underlying Connection.ulcPartnerIcon for
   the symbol's properties.

7) Create a symbol representing the Child Con-
   nection on the Parent Connection's window.
   This symbol connects the symbols created in
   1c1ciivi4a5 and 1c1ciivi4a6. Use Underlying
   Connection.ulcLabel and Underlying
   Connection.ulcIcon for the symbol's properties.

8) Let Child Connection be called *Parent Con-
   nection* for step 1c1ciivi4a9.

RA994036

> Recursively process each Simple Connection
>
> If the underlying Simple Connection in turn has Underlying Connections, then create a window for the underlying Simple Connection. Create a symbol on the underlying Simple Connection's window for each of the underlying Simple Connection's Underlying Connections.

9) Go to step 1c1ciivi4 and return here when finished with that step.

vii) IF (Parent Arc.zDetailsIndexId != -1) THEN

1. Find the row of the Simple Connection table such that (localEndpointProtocol == Parent Arc.zEndpointProtocol) AND (localEndpointName == Parent Arc.zEndpointName) AND (simpleConnIndexId == Parent Arc.zDetailsIndexId).

2. Let this row of the Simple Connection table be called *Parent Connection* for step 1c1ciivii3.

3. Go to step 1c1ciivi3 and return here when finished with step 1c1ciivi4.

viii) FOR each row of the Underlying Arcs table :

Create a symbol for each Underlying Arc

If the Parent Arc has Underlying Arcs, then create a window for the Parent Arc. Create a symbol on the Parent Arc's window for each of the Parent Arc's Underlying Arcs.

1. IF (ulaAendpointProtocol == Parent Arc.aEndpointProtocol) AND (ulaAendpointName == Parent Arc.aEndpointName) AND (ulaZendpointProtocol == Parent Arc.zEndpointProtocol) AND (ulaZendpointName == Parent Arc.zEndpointName) AND (ulaArcIndexId == Parent Arc.arcIndexId) THEN a. Let this row of the Underlying Arcs table be called *Underlying Arc* for the remainder of step 1c1ciiviii1.

b. IF (there is no window representing Parent Arc in the EUI) THEN

1) Create a window for Parent Arc.

Do not display a background graphic in this window.

2) IF (Underlying Arc.underlyingArcKind == serial) THEN a) When symbols are created on this window, arrange them as Serial Connections.

RA994036

3) IF (Underlying Arc.underlyingArcKind == parallel) THEN a) When symbols are created on this window, arrange them as Parallel Connections.

c. Find the row of the Arc table such that (aEndpointProtocol == Underlying Arc.uconnAendpointProtocol) AND (aEndpointName == Underlying Arc.uconnAendpointName) AND (zEndpointProtocol == Underlying Arc.uconnZendpointProtocol) AND (zEndpointName == Underlying Arc.uconnZendpointName) AND (arcIndexId == Underlying Arc.uconnArcIndexId).

d. Let this row of the Arc table be called *Child Arc* for the remainder of step 1c1ciiviii1.

e. Create a symbol representing the endpoint Child Arc.aEndpointProtocol, Child Arc.aEndpointName on the Parent Arc's window.

Use Underlying Arc.ulaAlabel and Underlying Arc.ulaAicon for the symbol's properties.

f. Create a symbol representing the endpoint Child Arc.zEndpointProtocol, Child Arc.zEndpointName on the Parent Arc's window.

Use Underlying Arc.ulaZlabel and Underlying Arc.ulaZicon for the symbol's properties.

g. Create a symbol representing the Child Arc on the Parent Arc's window.

This symbol connects the symbols created in 1c1ciiviii1e and 1c1ciiviii1f. Use Underlying Arc.ulaLabel and Underlying Arc.ulaIcon for the connecting symbol's properties.

h. Let Child Arc be called *Parent Arc* for steps 1c1ciiviii1i and 1c1ciiviii1j.

Recursively process each Arc

If the underlying Arc has Simple Connections, then create symbols on the Parent Arc's window for these Simple Connections.

If the underlying Arc in turn has Underlying Arcs, then create a window for the underlying Arc. Create a symbol on the underlying Arc's window for each of the underlying Arc's Underlying Connections.

i. Go to step 1c1ciivi and return here when finished with step 1c1ciivii.

j. Go to step 1c1ciiviii and return here when finished with that step.

Figure 2:
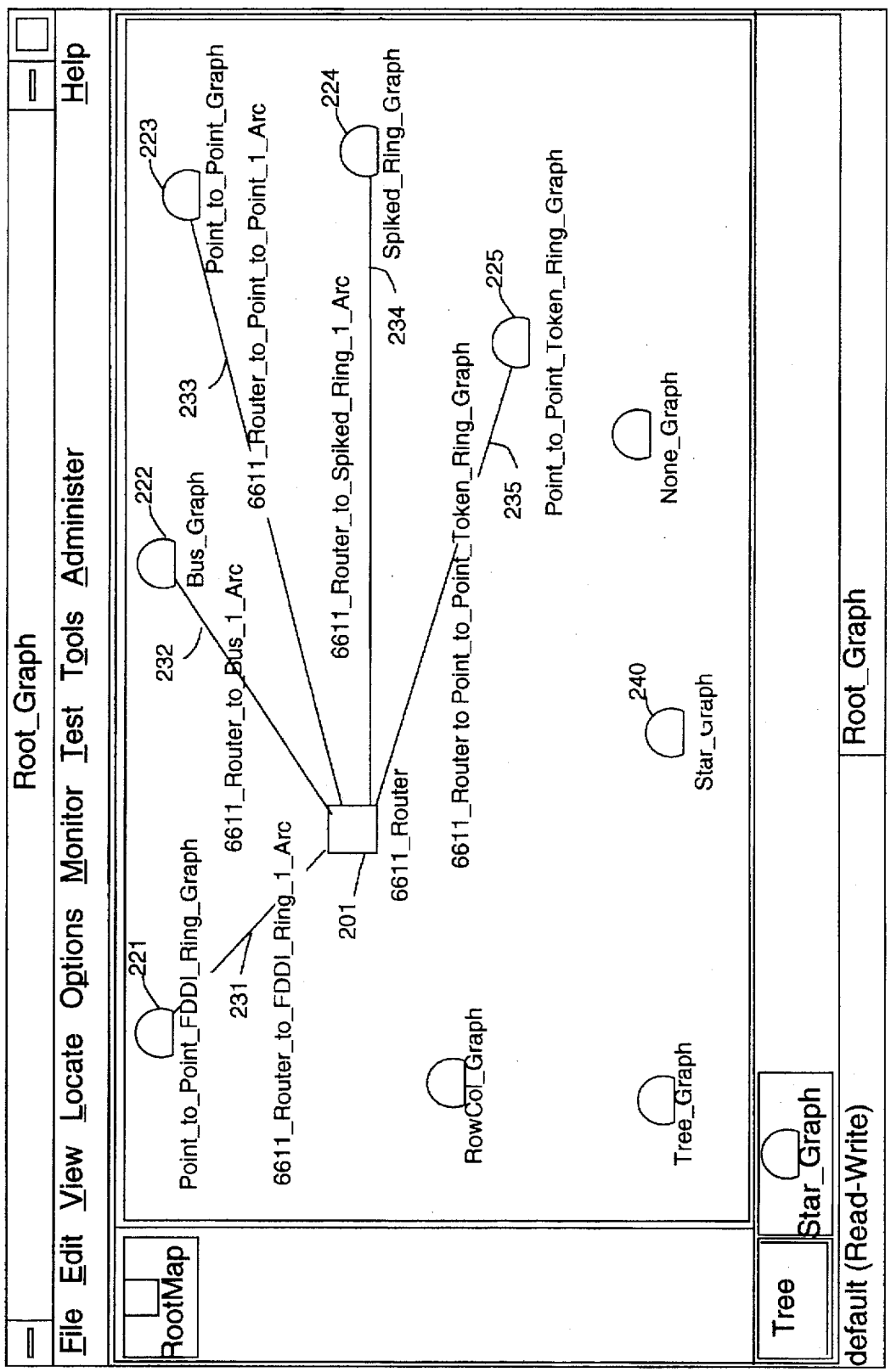
FIG. 2 illustrates a topological representation of a computer communications network encoded using the method of the invention and displayed on a user interface.

The above mentioned method of parsing through the information stored in the GTM tables 121–123 will result in displays such as that shown in FIG. 2. FIG. 2 displays the root graph for an IBM 6611 Router 201 connected to a point-to-point FDDI ring 221, a bus 222, another point-to-point network 223, a spoked ring 224 (such as an Ethernet), and a point-to-point token ring 225. FIG. 2 also demonstrates the connections from the IBM 6611 Router root 201 to the mentioned subnetworks 221–225 by the arc graphs 231–235.

Figure 3:
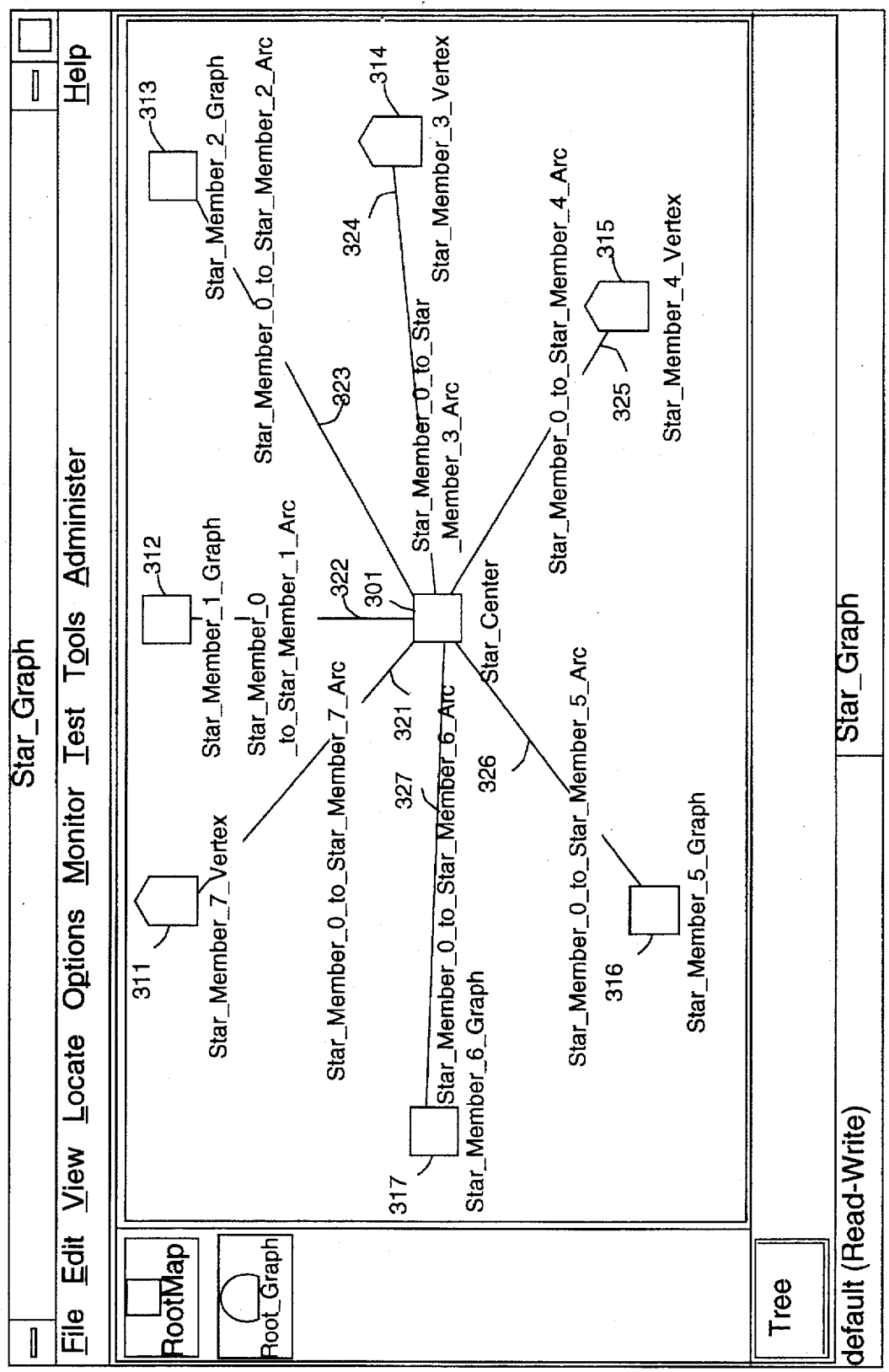
FIG. 3 illustrates a more detailed topological representation of a single element contained in the topological representation of FIG. 2.

FIG. 3 demonstrates the exploding of the star graph 240 from FIG. 2. FIG. 3 depicts the root graph for the star_center 301 and all of the devices or members connected to that root 311–317, as well as the links by which they are connected 321–327.

While the invention has been particularly shown and described with reference to the particular embodiment thereof, it will be understood by those skilled in the art the various changes in form and detail may be made therein without departing from the spirit and scope of the invention.

Having thus described our invention, what we claim and desire to secure as Letter Patent is as follows:

TABLE 1

TYPE AND STATUS DEFINITIONS

A. VertexProtocol
  The type VertexProtcol is used for both vertex and graph
  protocols. If the VertexProtocol is an INTEGER, the variable
  identifies a vertexProtocol value from
  the Vertex table. If the VertexProtocol
  is an OBJECT IDENTIFER, the variable
  identifies a graphProtocol from the Graph table.
  VertexProtocol ::= CHOICE { INTEGER {
          nonexistent(0),
          other(1),
          regular1822(2),
          hdh1822(3),
          ddn-x25(4),
          rfc877-x25(5),
          ethernet-csmacd(6),
          iso88023-csmacd(7),
          iso88024-tokenBus(8),
          iso88025-tokenRing(9),
          iso88026-man(10),
          starLan(11),
          proteon-10mbit(12),
          proteon-80mbit(13),
          hyperchannel(14),
          fddi(15),
          lapb(16),
          sdlc(17),
          dsl(18),
          el(19),
          basicISDN(20),
          primaryISDN(21),

TABLE 1-continued

TYPE AND STATUS DEFINITIONS propPointToPointSerial(22),
          ppp(23),
          softwareLoopback(24),
          eon(25),
          ethernet-3mbit(26),
          nsip(27),
          slip(28),
          ultra(29),
          ds3(38),
          sip(31),
          frame-relay(32),
          },
        OBJECT IDENTIFIER }

B. Operational State
  OperationalState ::= INTEGER { disabled(1), enabled(2) }
C. UnknownStatus
  UnknownStatus ::= INTEGER { true(1), false(2) }
D. AvailabilityStatus
  The AvailabilityStatus is an integer value formed by combining
  the following values with the bitwise OR operator.

| Definition | Value |
| --- | --- |
| empty_set | 0 |
| inTest | 1 |
| failed | 2 |
| powerOff | 4 |
| offLine | 8 |
| offDuty | 16 |
| dependency | 32 |
| degraded | 64 |
| notinstalled | 128 |

E. AlarmStatus
  The AlarmStatus is an integer value formed by
  combining the following values with the bitwise OR operator.

| Definition | Value |
| --- | --- |
| empty_set | 0 |
| underRepair | 1 |
| critical | 2 |
| major | 4 |
| minor | 8 |
| alarmOutstanding | 16 |

TABLE 2

VERTEX ELEMENT DEFINITION

| Variable | Syntax | Description |
| --- | --- | --- |
| vertexType | INTEGER {other(1), invalid(2), vertex(3)} | This variable indicates the class of the row and its validity. |
| vertexProtocol | VertexProtocol | The protocol in which the vertexName is defined. |
| vertexName | OCTET STRING | This is the unique name for the Vertex. If the vertex has a protocol specific name, this should be used for it. |
| vertexMine | INTEGER {mine(1), notmine(2)} | Is the Vertex represented by the agent which owns this table? |

TABLE 2-continued

VERTEX ELEMENT DEFINITION

| Variable | Syntax | Description |
| --- | --- | --- |
| vertexLocation | DisplayString | Location of the vertex. |
| vertexManagementExtension | OBJECT IDENTIFIER | The object identifier of the table that contains resource specific information about this vertex. |
| vertexManagementAddr | OCTET STRING | The address of the source of vertexManagementExtension. |
| vertexOperationalState | OperationalState | The operational state of the Vertex. |
| vertexUnknownStatus | UnknownStatus | The unknown status of the Vertex. |
| vertexAvailabilityStatus | AvailabilityStatus | The availability status of the Vertex. |
| vertexAlarmStatus | AlarmStatus | The alarm status of the Vertex. |

TABLE 3

SERVICE ACCESS POINT ELEMENT DEFINITION

| Variable | Syntax | Description |
| --- | --- | --- |
| sapType | INTEGER {valid(1), invalid(2)} | The validity of this row. |
| sapVertexProtocol | VertexProtocol | The vertexProtocol field of the vertex which uses or provides a SAP. |
| sapVertexName | OCTET STRING | The vertexName field of the vertex which uses or provides a SAP. |
| sapServiceType | INTEGER {using(1), providing(2)} | Is the SAP used or provided by the Vertex identified by sapVertexProtocol and sapVertexName? |
| sapProtocol | VertexProtocol | This value of the SAP protocol. |
| sapName | OCTET STRING | The value of the SAP address. |

TABLE 4

SIMPLE CONNECTION ELEMENTS DEFINITION

| Variable | Syntax | Description |
| --- | --- | --- |
| simpleConnType | INTEGER {other(1), invalid(2), simpleConnection(3)} | The validity of this row |
| localEndpointProtocol | VertexProtocol | The value of the vertexProtocol or graphProtocol of the connection endpoint (Vertex or Graph) to which this endpoint specific information applies. |
| localEndpointName | OCTET STRING | The value of the vertexName or graphName of the connection endpoint (Vertex or Graph) to which this endpoint specific information applies. |
| simpleConnIndexId | INTEGER | This field contains an index used to uniquely identify each Simple Connection for the same local endpoint. |
| simpleConnLabel | DisplayString | The label to be used on the display for this simple connection. |
| connectionPartnerProtocol | VertexProtocol | The vertexProtocol or graphProtocol of the endpoint (Vertex or Graph) at the other end of the connection. |
| connectionPartnerName | OCTET STRING | The vertexName or graphName of the endpoint (Vertex or Graph) at the other end of the connection. |
| simpleConnManagement Extension | OBJECT IDENTIFIER | The object identifier of the table that contains resource specific information about this Simple Connection. |
| SimpleConnManagement Addr | OCTET STRING | The address of the source of simpleConnManagementExtension. |
| simpleConnIcon | DisplayString | The icon to use on the display for this Simple Connection. |
| simpleConnOperationalState | OperationalState | The operational state of the Simple Con- |

TABLE 4-continued

SIMPLE CONNECTION ELEMENTS DEFINITION

| Variable | Syntax | Description |
|---|---|---|
| | | nection. |
| simpleConnUnknownState | UnknownState | The unknown status of the Simple Connection. |
| simpleConnAvailability Status | AvailabilityStatus | The availability status of the Simple Connection |
| simpleConnAlarmStatus | AlarmStatus | The alarm status of the Simple Connection. |

TABLE 5

UNDERLYING CONNECTIONS ELEMENT DEFINITION

| Variable | Syntax | Description |
|---|---|---|
| ulcType | INTEGER {valid(1), invalid(2)} | The validity of this row. |
| ulcEndpointProtocol | VertexProtocol | The value of the localEndpointProtocol of the containing Simple Connection. |
| ulcEndpointName | OCTET STRING | The value of the localEndpointName of the containing Simple Connection. |
| ulcEndpointId | INTEGER | The value of the simpleConnIndexId of the containing Simple Connection. |
| underlyingConnectionKind | INTEGER {serial(1), parallel(2)} | Is the Underlying Connection parallel or serial? |
| uconnEndpointProtocol | VertexProtocol | The value of the localEndpointProtocol of the underlying Simple Connection. |
| uconnEndpointName | OCTET STRING | The value of the localEndpointName of the underlying Simple Connection. |
| uconnSimpleConnId | INTEGER | The value of the simpleConnIndexId of the underlying Simple Connection. |
| nextSerialUconnEndpoint Protocol | VertexProtocol | The value of the uconnEndpointProtocol of the next serial Underlying Connection. This value is pertinent when the value of underlyingConnectionKind is serial. |
| nextSerialUconnEndpoint Name | OCTET STRING | The value of the uconnEndpointName of the next serial Underlying Connection. This value is pertinent when the value of underlyingConnectionKind is serial. |
| nextSerialUconnSimple ConnId | INTEGER | The value of the uconnSimpleConnId of the next serial Underlying Connection. This value is pertinent when the value of underlyingConnectionKind is serial. |
| ulcLabel | DisplayString | The label to use on the display for the underlying Simple Connection. |
| ulcIcon | DisplayString | The icon to use on the display for the underlying Simple Connection. |
| ulcLocation | DisplayString | The label to use on the display for the local endpoint of the underlying Simple Connection. |
| ulcLocalIcon | DisplayString | The icon to use on the display for the local endpoint of the underlying Simple Connection. |
| ulcPartnerLabel | DisplayString | The label to use on the display for the connection partner endpoint of the underlying Simple Connection. |
| ulcPartnerIcon | DisplayString | The icon to use on the display for the lying Simple Connection |

TABLE 6

ARC ELEMENT DEFINITION

| Variable | Syntax | Description |
|---|---|---|
| arcType | INTEGER {other(1), invalid(2), arc(3)} | The type of the Arc and its validity. |
| aEndpointProtocol | VertexProtocol | The value of either the vertexProtocol or graphProtocol of one endpoint (Vertex or Graph) of the Arc. |
| aEndpointName | OCTET STRING | The value of the vertexName or |

TABLE 6-continued

ARC ELEMENT DEFINITION

| Variable | Syntax | Description |
|---|---|---|
| | | graphName of one endpoint (Vertex or Graph) of the Arc. |
| zEndpointProtocol | VertexProtocol | The value of either the vertexProtocol or graphProtocol of the other endpoint (Vertex or Graph) of the Arc. |
| zEndpointName | OCTET STRING | The value of the vertexName or graphName of the other endpoint (Vertex or Graph) of the Arc. |
| arcIndexId | INTEGER | The index value used to uniquely identify each arc between the same two endpoints. |
| aDetailsIndexId | INTEGER | The value of the simpleConnIndexId of the Simple Connection for aEndpoint, or −1 if aEndpoint has no Simple Connection for the Arc. This value may be combined with aEndpointProtocol and aEndpointName to index one of aEndpoint's Simple Connections. |
| zDetailsIndexId | INTEGER | The value of the simpleConnIndexId of the Simple Connection for zEndpoint, or −1 if zEndpoint has no Simple Connection for this Arc. This value may be combined with zEndpointProtocol and zEndpointName to index one of zEndpoint's Simple Connections. |
| arcManagementExtension | OBJECT IDENTIFIER | The object identifier of the table that contains resource specific information about this Arc. |
| arcManagementAddr | OCTET STRING | The address of the source of arcManagement extension. |
| arcOperationalState | OperationalState | The operational state of the Arc. |
| areUnknownStatus | UnknownStatus | The unknown status of the Arc. |
| arcAvailabilityStatus | AvailabilityStatus | The availability status of the Arc. |
| arcAlarmStatus | AlarmStatus | The alarm status of the Arc |

TABLE 7

UNDERLYING ARCS ELEMENT DEFINITION

| Variable | Syntax | Description |
|---|---|---|
| ulaType | INTEGER {valid(1), invalid(2)} | The validity of this row. |
| uconnAendpointProtocol | VertexProtocol | The value of the aEndpointProtocol of the containing Arc. |
| ulaAendpointName | OCTET STRING | The value of the aEndpointName of the containing Arc. |
| ulaZendpointProtocol | VertexProtocol | The value of the zEndpointProtocol of the containing Arc. |
| ulaZendpointName | OCTET STRING | The value of the zEndpointName of the containing Arc. |
| ulaArcIndexId | INTEGER | The value of the arcIndexId of the containing Arc. |
| underlyingArcKind | INTEGER {serial(1), parallel(2)} | Is the Underlying Arc parallel or serial? |
| uconnAendpointProtocol | VertexProtocol | The value of the aEndpointProtocol of the underlying Arc. |
| uconnAendpointName | OCTET STRING | The value of the aEndpointName of the underlying Arc. |
| uconnZendpointProtocol | VertexProtocol | The value of the zEndpointProtocol of the underlying Arc. |
| uconnZendpointName | OCTET STRING | The value of the zEndpointName of the underlying Arc. |
| uconnArcIndexId | INTEGER | The value of the arcIndexId of the underlying Arc. |
| nextSerialAendpointProtocol | VertexProtocol | The value of the uconnAendpointProtocol of the next serial Underlying Arc. This value is pertinent when the value of underlyingArcKind is serial. |
| nextSerialAendpointName | OCTET STRING | The value of the uconnAendpointName of the next serial Underlying Arc. This value is pertinent when the value of underlyingArcKind is serial. |

TABLE 7-continued

UNDERLYING ARCS ELEMENT DEFINITION

| Variable | Syntax | Description |
|---|---|---|
| nextSerialZendpointProtocol | VertexProtocol | The value of the uconnZendpointProtocol of the next serial Underlying Arc. This value is pertinent when the value of underlyingArcKind is serial. |
| nextSerialZendpointName | OCTET STRING | The value of the uconnZendpointName of the next serial Underlying Arc. This value is pertinent when the value of underlyingArcKind is serial. |
| nextSerialUlaIndexId | INTEGER | The value of the ulaIndexId of the next serial Underlying Arc. This value is pertinent when the value of underlyingArcKind is serial. |
| ulaLabel | DisplayString | The label to use on the display for the underlying Arc. |
| ulaIcon | DisplayString | The icon to use on the display for the underlying Arc. |
| ulaAlabel | DisplayString | The label to use on the display for the aEndpoint of the underlying Arc. |
| ulaAicon | DisplayString | The icon to use on the display for the aEndpoint of the underlying Arc. |
| ulaZlabel | DisplayString | The label to use on the display for the zEndpoint of the underlying Arc. |
| ulaZicon | DisplayString | The icon to use on the display for the zEndpoint of the underlying Arc. |

TABLE 8

GRAPH ELEMENT DEFINITION

| Variable | Syntax | Description |
|---|---|---|
| graphType | INTEGER {other(1), invalid(2), graph(3), box(4)} | The type of the Graph and its validity. |
| graphProtocol | OBJECT IDENTIFIER | The protocol in which the graphName is defined. |
| graphName | OCTET STRING | This is the unique name for this Graph. If the Graph has a protocol specific name, this should be used for it. |
| layoutAlgorithm | INTEGER {none(1), userdefined(2), pointToPoint(3), bus(4), star(5), spoked-ring(6), rowcol(7), pointToPoint-ring(8), tree(9)} | The layout algorithm used when displaying this Graph. |
| userdefinedLayout | DisplayString | The name of the user defined layout algorithm. This value is pertinent when the value of layoutAlgorithm is userdefined. |
| graphLocation | DisplayString | The location of the Graph. |
| backgroundMap | DisplayString | The name of the background picture that should be used as a backdrop to the Graph on the display. |
| graphManagementExtension | OBJECT IDENTIFIER | The object identifier of the table that contains resource specific information about this Graph. |
| graphManagementAddr | OCTET STRING | The address of the source of graphManagementExtension. |
| isRoot | INTEGER {true(1), false(2)} | Is this Graph the root of a tree of Graphs? |

TABLE 9

MEMBER ARCS ELEMENT DEFINITION

| Variable | Syntax | Description |
|---|---|---|
| maType | INTEGER {valid(1), | The validity of the row. |
| maGraphProtocol | OBJECT IDENTIFIER | The value of the graphProtocol of the containing Graph. |

TABLE 9-continued

MEMBER ARCS ELEMENT DEFINITION

| Variable | Syntax | Description |
|---|---|---|
| maGraphName | OCTET STRING | The value of the graphName of the containing Graph. |
| maAendpointProtocol | VertexProtocol | The value of the aEndpointProtocol of the contained Arc. |
| maAendpointName | OCTET STRING | The value of the aEndpointName of the contained Arc. |
| maZendpointProtocol | VertexProtocol | The value of the zEndpointProtocol of the contained Arc. |
| maZendpointName | OCTET STRING | The value of the zEndpointName of the contained Arc. |
| maArcIndexId | INTEGER | The value of the arcIndexId of the contained Arc. |
| maLabel | DisplayString | The label to use on the display for the contained Arc. |
| maIcon | DisplayString | The icon to use on the display for the contained Arc. |

TABLE 10

GRAPH ATTACHED ARCS ELEMENT DEFINITION

| Variable | Syntax | Description |
|---|---|---|
| aaType | INTEGER {valid(1), invalid(2)} | The validity of the row. |
| aaGraphProtocol | OBJECT IDENTIFIER | The value of the graphProtocol of the Graph which contains one endpoint of the Arc. |
| aaGraphName | OCTET STRING | The value of the graphName of the Graph which contains one endpoint of the Arc. |
| aaAendpointProtocol | Vertex Protocol | The value of the aEndpointProtocol of the partially contained Arc. |
| aaAendpointName | OCTET STRING | The value of the aEndpointName of the partially contained Arc. |
| aaZendpointProtocol | VertexProtocol | The value of the zEndpointProtocol of the partially contained Arc. |
| aaZendpointName | OCTET STRING | The value of the zEndpointName of the partially contained Arc. |
| aaArcIndexId | INTEGER | The value of the arcIndexId of the partially contained Arc. |

TABLE 11

MEMBER ELEMENT DEFINITION

| Variable | Syntax | Description |
|---|---|---|
| memberType | INTEGER {valid(1), invalid(2)} | The validity of the row. |
| memberProtocol | OBJECT IDENTIFIER | The value of the graphProtocol of the containing Graph. |
| memberName | OCTET STRING | The value of the graphName of the containing Graph. |
| memberComponentProtocol | VertexProtocol | The value of the vertexProtocol or graphProtocol of the contained Vertex or Graph. |
| memberComponentName | OCTET STRING | The value of the vertexName or graphName of the contained Vertex or Graph. |
| memberLabel | DisplayString | The label to use on the display for the contained Vertex or Graph. |
| memberIcon | DisplayString | The icon to use on the display for the contained Vertex or Graph. |

TABLE 12

ADDITIONAL MEMBERS INFORMATION ELEMENT DEFINITION

| Variable | Syntax | Description |
| --- | --- | --- |
| aMemberType | INTEGER{valid(1), invalid(2)} | The validity of the row. |
| aMemberProtocol | OBJECT IDENTIFIER | The value of the memberProtocol of the Member for which this Additional Member Information pertains. |
| aMemberName | OCTET STRING | The value of the memberName of the Member for which this Additional Member Information pertains. |
| aMemberComponent Protocol | VertexProtocol | The value of the memberComponentProtocol of the Member for which this Additional Member Information pertains. |
| aMemberComponentName | OCTET STRING | The value of the memberComponentName of the Member for which this Additional Member Information pertains. |
| xCoordinate | INTEGER | The x coordinate to use when placing this Member's icon on the display. This value pertains only when the containing Graph's layoutAlgorithm supports explicit icon placement. |
| yCoordinate | INTEGER | The y coordinate to use when placing this Member's icon on the display. This value pertains only when the containing Graph's layoutAlgorithm supports explicit icon placement. |
| xGrid | INTEGER | The scale to which the xCoordinate applies. This value pertains only when the containing Graph's layoutAlgorithm supports explicit icon placement. |
| yGrid | INTEGER | The scale to which the yCoordinate applies. This value pertains only when the containing Graph's layoutAlgorithm supports explicit icon placement. |

TABLE 13

ADDITIONAL GRAPH INFORMATION ELEMENT DEFINITION

| Variable | Syntax | Description |
| --- | --- | --- |
| addGraphType | INTEGER {other(1), invalid(2), graph(3), box(4)} | The type of the Graph and the validity of this row. |
| addGraphProtocol | OBJECT IDENTIFIER | The value of the graphProtocol of the Graph for which this Additional Graph Information pertains. |
| addGraphName | OCTET STRING | The value of the graphName of the Graph for which this Additional Graph Information pertains. |
| addGraphIndexId | INTEGER | The instance identifier for all rows in this table for the same Graph. |
| graphRootProtocol | VertexProtocol | For any layout algorithm that has a root or center Member, this value identifies the memberComponentProtocol of the root Member. It is combined with addGraphProtocol, addGraphName, and graphRootName to define the index of the root Member. |
| graphRootName | OCTET STRING | For any layout algorithm that has a root or center Member, this value identifies the memberComponentName of the root Member. It is combined with addGraphProtocol, addGraphName, and graphRootProtocol to define the index of the root Member. |
| graphDesc1 | DisplayString | Descriptive information about or an annotation of the Graph. |
| graphDescrX | INTEGER | The xCoordinate used to place graphDesc1 on the display. |
| graphDescrY | INTEGER | The yCoordinate used to place graphDesc1 on the display. |

TABLE 13-continued

ADDITIONAL GRAPH INFORMATION ELEMENT DEFINITION

| Variable | Syntax | Description |
| --- | --- | --- |
| graphDescrXgrid | INTEGER | The scale to which the graphDescrX applies. |
| graphDescrYgrid | INTEGER | The scale to which the graphDescrY applies. |
| rootGraphLabel | DisplayString | The label to use on the display to represent the Graph as the root of a tree of Graphs. This value only pertains when the Graph's isRoot value is true. |
| rootGraphIcon | DisplayString | The icon to use on the display to represent the Graph as the root of a tree of Graphs. This value only pertains when the Graph isRoot value is true. |

TABLE 14

TRAP GENERATION CONTROLS

| Variable | Syntax | Description |
| --- | --- | --- |
| newVertexTraps | INTEGER {on(1), off(2)} | Determines if new element traps should be issued for the Vertex Group. |
| deletedVertexTraps | INTEGER {on(1), off(2)} | Determines if deleted element traps should be issued for the Vertex Group. |
| vertexStateChangeTraps | INTEGER {on(1), off(2)} | Determines if state change traps should be issued for the Vertex Group. |
| vertexVariableChangeTraps | INTEGER {on(1), off(2)} | Determines if variable change traps should be issued for the Vertex Group. |
| newSimpleConnectionTraps | INTEGER {on(1), off(2)} | Determines if new element traps should be issued for the Simple Connection Group. |
| deletedSimpleConnection Traps | INTEGER {on(1), off(2)} | Determines if deleted element traps should be issued for the Simple Connection Group. |
| simpleConnectionState ChangeTraps | INTEGER {on(1), off(2)} | Determines if state change traps should be issued for the Simple Connection Group. |
| simpleConnectionVariable ChangeTraps | INTEGER {on(1), off(2)} | Determines if variable change traps should be issued for the Simple Connection Group. |
| newArcTraps | INTEGER {on(1), off(2)} | Determines if new element traps should be issued for the Arc Group. |
| deletedArcTraps | INTEGER {on(1), off(2)} | Determines if deleted element traps should be issued for the Arc Group. |
| arcStateChangeTraps | INTEGER {on(1), off(2)} | Determines if state change traps should be issued for the Arc Group. |
| arcVariableChangeTraps | INTEGER {on(1), off(2)} | Determines if variable change traps should be issued for the Arc Group. |
| newGraphTraps | InTEGER {on(1), off(2)} | Determines if new element traps should be issued for the Graph Group. |
| deletecGraphTraps | INTEGER {on(1), off(2)} | Determines if deleted element traps should be issued for the Graph Group. |
| graphStateChangeTraps | INTEGER {on(1), off(2)} | Determines if state change traps should be issued for the Graph Group. |
| graphVariableChangeTraps | INTEGER {on(1), off(2)} | Determines if variable change traps should be issued for the Graph Group. |

Note: These are the variables used for trap generation. An agent will generate traps for any variables that have a value of "on".

We claim:

1. A system for generalized network topology representation in a communications network including a network management station on which a network management application operates, said communications network containing a plurality of resources grouped into one or more subnetworks and coupled by connecting links, said system comprising:
   means for encoding topology information for each network resource that is discovered by a topology discovery component of said network management application into a plurality of discrete data elements;
   means for storing said plurality of discrete data elements into a plurality of topology element tables in a database at said network management station; and
   means for processing said plurality of topology element tables by recursively traversing each individual row in each of said topology element tables and presenting said plurality of discrete data elements contained therein to a user interface display.

2. The system for generalized topology representation of claim 1 wherein said plurality of topology element tables includes a plurality of data element tables, a plurality of relationship element tables, and a plurality of auxiliary element tables.

3. The system of claim 2 wherein said plurality of data element tables further includes a vertex .table, a graph table, an arc table and a simple connections table.

4. The system of claim 3 wherein said plurality of relationship element tables further includes a members table, a member arcs table, a graph attached arcs table, an underlying arcs table, an underlying connections table and a service access point table.

5. The system of claim 4 wherein said plurality of auxiliary element tables further includes an additional graph information table and an additional members information table.

6. The system of claim 5 wherein said means for processing and presenting includes:

means for identifying each root graph in said graph table and generating a symbol representing said each root graph on a root window;

means for determining if a parent graph is a root graph or an orphan graph, and if said parent graph is either, generating a window for said parent graph;

means, responsive to said means for determining, for generating a symbol on said window for said parent graph for each member and each member arc contained in said parent graph;

means for determining the position of each member in said window for said parent graph;

means for generating a symbol for each simple connection in said window for said parent graph;

means for generating a symbol for each underlying connection in said window for said parent graph;

means for processing each underlying connection recursively until a simple connection is found which has no other underlying connections;

means for generating a symbol for each underlying arc in said window for said parent graph; and means for generating a symbol for each simple connection contained within said each underlying arc in said window for said parent graph.

7. A method for generalized network topology representation in a communications network including a network management station on which a network management application operates, said communications network containing a plurality of resources grouped into one or more subnetworks and coupled by connecting links, said method comprising the steps of:

encoding topology information for each network resource that is discovered by a topology discovery component of said network management application into a plurality of discrete data elements;

storing said plurality of discrete data elements into a plurality of topology element tables in a database at said network management station; and processing said plurality of topology element tables by recursively traversing each individual row in each of said topology element tables and presenting said plurality of discrete data elements contained therein to a user interface display.

8. The method for generalized topology representation of claim 7 wherein said plurality of topology element tables for storing said plurality of discrete data elements includes a plurality of data element tables, a plurality of relationship element tables, and a plurality of auxiliary element tables.

9. The method of claim 8 wherein said plurality of data element tables further includes a vertex table, a graph table, an arc table and a simple connections table.

10. The method of claim 9 wherein said plurality of relationship element tables further includes a members table, a member arcs table, a graph attached arcs table, an underlying arcs table, an underlying connections table and a service access point table.

11. The method of claim 10 wherein said plurality of auxiliary element tables further includes an additional graph information table and an additional members information table.

12. The method of claim 11 wherein said processing and presenting step includes:

identifying each root graph in said graph table and generating a symbol representing said each root graph on a root window;

determining if a parent graph is a root graph or an orphan graph, and if said parent graph is either, generating a window for said parent graph;

generating a symbol on said window for said parent graph for each member and each member arc contained in said parent graph;

determining the position of each member in said window for said parent graph;

generating a symbol for each simple connection in said window for said parent graph;

generating a symbol for each underlying connection in said window for said parent graph;

processing each underlying connection recursively until a simple connection is found which has no other underlying connections;

generating a symbol for each underlying arc in said window for said parent graph; and generating a symbol for each simple connection contained within said each underlying arc in said window for said parent graph.

* * * * *